UNITED STATES PATENT OFFICE.

EBENEZER G. POMEROY, OF NEW YORK, N. Y., ASSIGNOR TO J. B. & W. W. CORNELL & CO., OF SAME PLACE.

IMPROVEMENT IN SMELTING AND REFINING IRON.

Specification forming part of Letters Patent No. 26,923, dated January 24, 1860.

*To all whom it may concern:*

Be it known that I, EBENEZER G. POMEROY, of the city, county, and State of New York, have invented a new and useful Improvement in the Smelting of Iron, which improvement is of such a nature that it can also be judiciously used in the process of refining iron; and I do hereby declare that the following is a full and exact description thereof.

My improvement in the process of smelting iron consists in the placing of certain of the ores of zinc, or the pure metal itself, immediately below the iron ore in the furnace, and then at the proper moment admitting steam or minute jets of water through the tuyeres with the air into said furnace during the process of smelting, whereby the iron is made to part with its carbonic acid and oxygen more readily, and is also by the presence of the zinc (in a volatilized state) prevented from becoming oxidized again, the zinc serving as a protecting agent, becoming itself oxidized and volatilized in the furnace.

As the principal ores of America are oxides or carbonates, a description of my improved process of treating these ores will serve as a guide for all others denominated "paying" ores. In the treatment of more refractory ores the flux must be used more freely.

In carrying out my said improvement in the smelting of iron I shall prepare the ores in the usual manner, and I shall employ the usual forms of furnaces. I have made use of anthracite coal for fuel in my said improved smelting process; but I have no doubt that nearly as good results would have been produced had I used charcoal or coke. For a flux in the said smelting process I have used the "franklinite" ore of New Jersey, which contains from fifteen to twenty per cent. of zinc.

My manner of charging a furnace and conducting the smelting process within the same is as follows, viz: I first place the requisite quantity of coal within the furnace and ignite the same, and as soon as a sufficient degree of heat is obtained therein I add the requisite quantity of zinc ore, and then the charge of iron ore mixed with the usual proportion of coal, and as soon as the iron commences to melt in the furnace I turn a jet of steam or one or more minute jets of water into each of the tuyeres. When the zinc ore employed by me in the aforesaid process has contained from fifteen to twenty per cent. of zinc, I have used one pound of the said ore for every five pounds of iron ore placed within the furnace. During the said smelting process the intense heat within the furnace volatilizes the zinc, and also produces a large quantity of hydrogen gas from the steam or water admitted into the same, and these gaseous products, as they ascend in the furnace, absorb and carry off the caabonic acid and the oxygen thrown off by the melting iron ore, and by so doing they prevent the melted iron within the furnace from mineralizing any of the earthy portions of the ore from which it is abstracted; and thus it will be perceived that my improved process of smelting iron necessarily produces a purer and consequently a tougher iron than has ever been produced by any former smelting process; or, in other words, the said process never produces either of the inferior descriptions of iron that are known in the trade as "hot-short" and "cold-short."

In the refining of iron I apply my aforesaid invention by placing a layer of zinc ore (or the equivalent thereof) upon the floor of the refining-chamber, and then discharge a quantity of steam or minute jets of water into the furnace. The said refining (or puddling) furnace may be so located with relation to the smelting-furnace that the iron may run from the latter directly into the former.

By varying the proportions of the steam or water admitted into a furnace, a softer or a harder iron may be produced at pleasure.

What I claim as my invention, and desire to secure by Letters Patent, is—

The use of any of the ores of zinc or the pure metal itself in iron-furnaces at the same time that jets of steam or water are discharged into said furnaces, substantially in the manner and for the purpose herein set forth.

EBENEZER G. POMEROY.

Witnesses:
THOS. CROCKER,
CHAS. H. FIELD.